(12) United States Patent
Park et al.

(10) Patent No.: US 10,723,876 B2
(45) Date of Patent: Jul. 28, 2020

(54) THERMOPLASTIC RESIN COMPOSITION AND MOLDED ARTICLE COMPRISING THE SAME

(71) Applicant: Lotte Advanced Materials Co., Ltd., Yeosu-si (KR)

(72) Inventors: Jeong Eun Park, Uiwang-si (KR); Hee Yun Jeong, Uiwang-si (KR); Kee Hae Kwon, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 201 days.

(21) Appl. No.: 15/222,188

(22) Filed: Jul. 28, 2016

(65) Prior Publication Data

US 2017/0029617 A1 Feb. 2, 2017

(30) Foreign Application Priority Data

Jul. 31, 2015 (KR) .................. 10-2015-0109217

(51) Int. Cl.
*C08L 69/00* (2006.01)
*C08L 67/02* (2006.01)

(52) U.S. Cl.
CPC .............. *C08L 69/00* (2013.01); *C08L 67/02* (2013.01)

(58) Field of Classification Search
CPC .................................. C08L 67/02; C08L 69/00
See application file for complete search history.

(56) References Cited

U.S. PATENT DOCUMENTS

| | | | |
|---|---|---|---|
| 8,044,143 B2 | 10/2011 | Park et al. | |
| 2012/0065318 A1 | 3/2012 | Park et al. | |
| 2015/0141560 A1 | 5/2015 | Yu et al. | |

FOREIGN PATENT DOCUMENTS

| | | |
|---|---|---|
| CN | 104650546 A | 5/2015 |
| CN | 104693739 A | 6/2015 |
| CN | 104710736 A | 6/2015 |
| CN | 104725812 A | 6/2015 |
| DE | 102009055098 A1 | 7/2010 |
| EP | 0122601 A1 | 10/1984 |
| JP | 59-191758 | 10/1984 |
| JP | 10251524 A * | 9/1998 |
| KR | 10-1995-0018277 A | 7/1995 |
| KR | 10-2010-0133786 A | 12/2010 |

OTHER PUBLICATIONS

Machine translation of JP-10251524-A. (Year: 1998).*
Office Action in counterpart Chinese Application No. 201610615557.5 dated Jan. 4, 2018, pp. 1-7.
English-translation of Office Action in counterpart Chinese Application No. 201610615557.5 dated Jan. 4, 2018, pp. 1-8.
Office Action in counterpart German Application No. 102016113859.2 dated Mar. 7, 2018, pp. 1-5.

* cited by examiner

*Primary Examiner* — Wenwen Cai
(74) *Attorney, Agent, or Firm* — Additon, Higgins & Pendleton, P.A.

(57) ABSTRACT

A thermoplastic resin composition and a molded article including the same. The thermoplastic resin composition includes about 100 parts by weight of a base resin including about 60 wt % to about 80 wt % of a polycarbonate (PC) resin and about 20 wt % to about 40 wt % of a polyester resin including a repeat unit represented by the following Formula 1 wherein in Formula 1, $Ar_1$ is a substituted or unsubstituted $C_6$ to $C_{18}$ arylene group and $R_1$ is a $C_1$ to $C_{20}$ linear alkylene group or a $C_3$ to $C_{20}$ branched alkylene group; and about 1 part by weight to about 3 parts by weight of a linear (meth)acrylic resin:

[Formula 1]

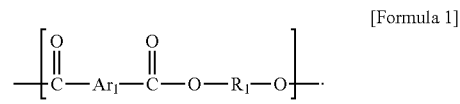

7 Claims, No Drawings

THERMOPLASTIC RESIN COMPOSITION AND MOLDED ARTICLE COMPRISING THE SAME

CROSS-REFERENCE TO RELATED APPLICATION

This application claims priority under 35 USC Section 119 to and the benefit of Korean Patent Application No. 10-2015-0109217, filed on Jul. 31, 2015 in the Korean Intellectual Property Office, the entire disclosure of which is incorporated herein by reference.

FIELD OF THE INVENTION

The present invention relates to a thermoplastic resin composition and a molded article including the same.

BACKGROUND

Thermoplastic resins exhibit good properties, such as low specific gravity, good moldability, and good impact resistance, as compared with glass or metal, and are useful for housings of electrical/electronic products, automotive interior/exterior materials, and exterior materials for buildings. Particularly, with the trend toward larger and lighter electrical/electronic products, plastic products produced from thermoplastic resins are quickly replacing existing glass and metal-based products.

Particularly, it is known in the art that a blend of a polyester resin and a polycarbonate resin exhibits both properties of the polyester resin such as high mechanical strength and good moldability and properties of the polycarbonate resin such as good thermal resistance, impact stability and dimensional stability.

In order to satisfy the recent trend of increasing the size of components, there is increasing demand for materials having high flowability. When a polycarbonate resin having a low weight average molecular weight is used in order to increase flowability of the blend of the polycarbonate resin and the polyester resin, there is a problem of deterioration in thermal resistance and mechanical properties such as impact resistance. Moreover, when the amount of the polyester resin is increased in order to improve flowability of the blend, there is a problem of deterioration in extrusion stability due to difference in viscosity between the polyester resin and the polycarbonate resin.

SUMMARY OF THE INVENTION

Embodiments of the present invention provide a thermoplastic resin composition that can exhibit good flowability with minimal or no deterioration in thermal resistance, and a molded article including the same.

Embodiments also provide a thermoplastic resin composition that can exhibit good properties in terms of extrusion stability, rigidity and compatibility, and a molded article including the same.

The thermoplastic resin composition includes: about 100 parts by weight of a base resin including about 60% by weight (wt %) to about 80 wt % of a polycarbonate (PC) resin and about 20 wt % to about 40 wt % of a polyester resin including a repeat unit represented by Formula 1 below; and about 1 part by weight to about 3 parts by weight of a linear (meth)acrylic resin:

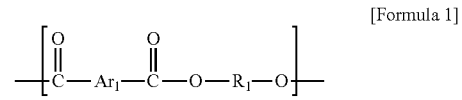

wherein $Ar_1$ is a substituted or unsubstituted $C_6$ to $C_{18}$ arylene group and $R_1$ is a $C_1$ to $C_{20}$ linear alkylene group or a $C_3$ to $C_{20}$ branched alkylene group.

The polyester resin may further include about more than 0 mol % to about 40 mol % of a repeat unit represented by Formula 2 below:

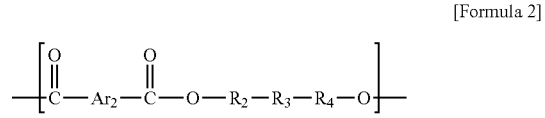

wherein $Ar_2$ is a substituted or unsubstituted $C_6$ to $C_{18}$ arylene group; $R_2$ and $R_4$ are the same or different and are each independently a single bond, a $C_1$ to $C_{20}$ linear alkylene group, or a $C_3$ to $C_{20}$ branched alkylene group; and $R_3$ is a $C_3$ to $C_{20}$ cyclic alkylene group.

The linear (meth)acrylic resin may be prepared by copolymerization of at least two kinds of $C_1$ to $C_{20}$ alkyl (meth)acrylates.

The linear (meth)acrylic resin may be a copolymer of methyl methacrylate (MMA) and butyl acrylate (BA).

The polycarbonate (PC) resin may have a weight average molecular weight (Mw) of about 20,000 g/mol to about 100,000 g/mol.

The polyester resin may have an inherent viscosity of about 0.5 dl/g to about 1 dl/g, as measured at 35° C. using an o-chlorophenol solution (concentration: 0.5 g/dl).

The copolymer of methyl methacrylate (MMA) and butyl acrylate (BA) may include methyl methacrylate (MMA) and butyl acrylate (BA) in a mole ratio of about 1:9 to about 9:1.

The thermoplastic resin composition may further include at least one additive selected from among antimicrobial agents, heat stabilizers, release agents, photostabilizers, dyes, inorganic additives, surfactants, coupling agents, plasticizers, admixtures, lubricants, antistatic agents, pigments, toners, flame retardants, colorants, UV absorbers, UV blocking agents, fillers, nucleating agents, adhesive aids, and adhesives.

Embodiments of the present invention also relate to a molded article including the thermoplastic resin composition, as set forth above.

The molded article may have a spiral flow of about 36 cm to about 50 cm, as measured under conditions of a mold temperature of 80° C. and an injection molding temperature of 270° C. in a mold having a 2 mm thick spiral cavity having a width of 5 mm.

The molded article may have a flexural modulus of about 22,000 kgf/cm² to about 40,000 kgf/cm², as measured on a 6.4 mm thick specimen in accordance with ASTM D790.

The molded article may have a heat deflection temperature (HDT) of 100° C. to 150° C., as measured on a 6.4 mm thick specimen under a load of 18.56 kgf/cm² in accordance with ASTM D648.

The present invention provides a thermoplastic resin composition that can exhibit good flowability with minimal or no deterioration in thermal resistance, and can have good properties in terms of extrusion stability, rigidity and/or compability, and a molded article including the same.

DETAILED DESCRIPTION

The above and other aspects, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

As used herein, the term "(meth)acrylate" may include an acrylate and/or a methacrylate.

As used herein, the term "copolymer" may include an oligomer, a polymer and/or a resin.

As used herein, the term "linear (meth)acrylic resin" may refer to a (meth)acrylic alternating copolymer, a (meth)acrylic block copolymer, and/or a (meth)acrylic random copolymer, and may refer to a non-grafted or non-branched (meth)acrylic copolymer.

Hereinafter, a thermoplastic resin composition according to the present invention will be described in detail.

The thermoplastic resin composition includes: about 100 parts by weight of a base resin including about 60 wt % to about 80 wt % of a polycarbonate (PC) resin and about 20 wt % to about 40 wt % of a polyester resin including a repeat unit represented by the following Formula 1; and about 1 part by weight to about 3 parts by weight of a linear (meth)acrylic resin:

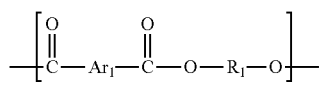

[Formula 1]

wherein $Ar_1$ is a substituted or unsubstituted $C_6$ to $C_{18}$ arylene group and $R_1$ is a $C_1$ to $C_{20}$ linear alkylene group or a $C_3$ to $C_{20}$ branched alkylene group.

Base Resin

Polycarbonate (PC) Resin

The polycarbonate (PC) resin is a polycarbonate resin used in a typical thermoplastic resin composition. For example, the polycarbonate (PC) resin may be an aromatic polycarbonate resin prepared by reacting one or more diphenols (for example, aromatic diol compounds) with a precursor, such as phosgene, halogen formate, and carbonic diester.

Examples of the diphenols may include without limitation 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-methyl-4-hydroxyphenyl)propane, 2,2-bis(3,5-dimethyl-4-hydroxyphenyl)propane, 2,2-bis(3-chloro-4-hydroxyphenyl)propane, 2,2-bis(3,5-dichloro-4-hydroxyphenyl)propane, and the like, and mixtures thereof. For example, the diphenol may include 2,2-bis(4-hydroxyphenyl)propane, 2,2-bis(3,5-dichloro-4-hydroxyphenyl)propane, 2,2-bis (3-methyl-4-hydroxyphenyl)propane, 2,2-bis (3,5-dimethyl-4-hydroxyphenyl)propane, and/or 1,1-bis(4-hydroxyphenyl)cyclohexane, for example, 2,2-bis(4-hydroxyphenyl)propane, which is also referred to as bisphenol A.

The polycarbonate (PC) resin may be a branched polycarbonate resin. For example, the polycarbonate (PC) resin may be a branched polycarbonate resin prepared by adding a tri- or higher polyfunctional compound, for example, a tri- or higher valent phenol group-containing compound, in an amount of about 0.05 mol % to about 2 mol % based on the total number of moles of the diphenols used in polymerization.

The polycarbonate (PC) resin may be a homopolycarbonate resin, a copolycarbonate resin, or a blend thereof.

In addition, the polycarbonate (PC) resin may be partly or completely replaced by an aromatic polyester-carbonate resin obtained through polymerization in the presence of an ester precursor, for example, a bifunctional carboxylic acid.

The polycarbonate (PC) resin may have a weight average molecular weight (Mw) of about 20,000 g/mol or more, for example about 20,000 g/mol to about 100,000 g/mol, and as another example about 20,000 g/mol to about 60,000 g/mol, about 20,000 g/mol to about 40,000 g/mol, for example, 20,000 g/mol, 24,000 g/mol, 27,000 g/mol, 28,000 g/mol, 30,000 g/mol, 32,000 g/mol, or 35,000 g/mol, as measured by gel permeation chromatography (GPC). Within this range of weight average molecular weights of the polycarbonate resin, a molded article formed of the thermoplastic resin composition can exhibit good properties in terms of flowability, thermal resistance, and/or rigidity.

In exemplary embodiments, the polycarbonate (PC) resin may be a blend of at least two kinds of polycarbonate resins having different weight average molecular weights. According to this embodiment, a molded article formed of the thermoplastic resin composition can exhibit good properties in terms of flowability, thermal resistance, and/or rigidity.

The base resin can include the polycarbonate (PC) resin in an amount of about 60 wt % to about 80 wt %, for example about 60 wt % to about 75 wt %, based on the total weight (100 wt %) of the base resin. In some embodiments, the base resin can include the polycarbonate resin in an amount of about 60, 61, 62, 63, 64, 65, 66, 67, 68, 69, 70, 71, 72, 73, 74, 75, 76, 77, 78, 79, or 80 wt %. Further, according to some embodiments, the amount of the polycarbonate resin can be in a range from about any of the foregoing amounts to about any other of the foregoing amounts.

Within this range, a molded article formed of the thermoplastic resin composition can exhibit further improved impact resistance and/or chemical resistance.

Polyester Resin

According to the present invention, the polyester resin may include a repeat unit represented by the following Formula 1:

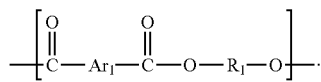

[Formula 1]

In Formula 1, $Ar_1$ is a substituted or unsubstituted $C_6$ to $C_{18}$ arylene group, for example a substituted or unsubstituted $C_6$ to $C_{12}$ arylene group, and as another example a substituted or unsubstituted $C_6$ to $C_{10}$ arylene group. Such a polyester resin can improve flowability of the thermoplastic resin composition, thereby improving processability.

In Formula 1, $R_1$ is a $C_1$ to $C_{20}$ linear alkylene group or a $C_3$ to $C_{20}$ branched alkylene group, for example a $C_1$ to $C_{10}$ linear alkylene group or a $C_3$ to $C_{20}$ branched alkylene group, and as another example a $C_1$ to $C_5$ linear alkylene group or a $C_3$ to $C_7$ branched alkylene group. Such a polyester resin can improve flowability of the thermoplastic resin composition, thereby improving processability.

The repeat unit represented by Formula 1 may be obtained through polymerization of a dicarboxylic acid component including an aromatic dicarboxylic acid and a diol component including a $C_1$ to $C_{20}$ linear alkylene group or a $C_3$ to $C_{20}$ branched alkylene group.

The dicarboxylic acid component may include an aromatic dicarboxylic acid and/or an aromatic dicarboxylate used in a typical polyester resin, for example, a $C_8$ to $C_{20}$ aromatic dicarboxylic acid and/or aromatic dicarboxylate. In addition, the dicarboxylic acid component may further include a linear and/or cyclic aliphatic dicarboxylic acid.

Examples of the aromatic dicarboxylic acid may include without limitation terephthalic acid (TPA), isophthalic acid (IPA), phthalic acid, 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid; and examples of the aromatic dicarboxylate may include without limitation dimethyl terephthalate (DMT), dimethyl isophthalate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, and dimethyl-2,7-naphthalate. These may be used alone or in combination thereof. In exemplary embodiments, terephthalic acid is used.

The diol component used as a reaction material to provide the repeat unit of Formula 1 includes a diol including a $C_1$ to $C_{20}$ linear alkylene group or a $C_3$ to $C_{20}$ branched alkylene group, and can provide good moldability, mechanical strength and/or flowability to the thermoplastic resin composition.

Examples of the diol including a $C_1$ to $C_{20}$ linear alkylene group or a $C_3$ to $C_{20}$ branched alkylene group may include without limitation ethylene glycol, 1,3-propane-diol, 1,3-butanediol, 1,4-butanediol, 1,4-pentanediol, 1,5-pentanediol, 1,6-hexanediol, 3-methylpentane-2,4-diol, 2-methylpentane-1,4-diol, 2,2,4-trimethylpentane-1,3-diol, 2-ethylhexane-1,3-diol, and 2,2-diethylpropane-1,3-diol, and the like, and mixtures thereof.

In another embodiment, the polyester resin may optionally include more than 0 mol % to about 40 mol % of a repeat unit represented by the following Formula 2, for example about 30 mol % or less, and as another example about 20 mol % or less, based on the total mol % (100 mol %) of the polyester resin. In some embodiments, the polyester resin can include the repeat unit represented by Formula 2 in an amount of 0 (the repeat unit represented by Formula 2 is not present), about 0 (the repeat unit represented by Formula 2 is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 mol %. Further, according to some embodiments, the amount of the repeat unit represented by Formula 2 can be in a range from about any of the foregoing amounts to about any other of the foregoing amounts.

Within this range, the polyester resin can improve miscibility between the components of the thermoplastic resin composition, thereby providing further improved properties to a molded article formed of the thermoplastic resin composition in terms of impact resistance, flowability, dimensional stability, external appearance, and the like.

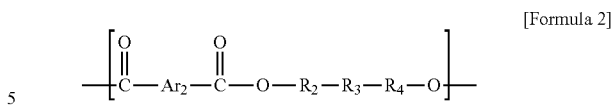

[Formula 2]

In Formula 2, $Ar_2$ is a substituted or unsubstituted $C_6$ to $C_{18}$ arylene group, for example a substituted or unsubstituted $C_6$ to $C_{12}$ arylene group, and as another example a substituted or unsubstituted $C_6$ to $C_{10}$ arylene group.

In Formula 2, $R_2$ and $R_4$ are the same or different and are each independently a single bond, a $C_1$ to $C_{20}$ linear alkylene group or a $C_3$ to $C_{20}$ branched alkylene group, for example a $C_1$ to $C_{10}$ linear alkylene group or a $C_3$ to $C_{12}$ branched alkylene group, and as another example a single bond, a $C_1$ to $C_5$ linear alkylene group or a $C_3$ to $C_7$ branched alkylene group.

In Formula 2, $R_3$ is a $C_3$ to $C_{20}$ cyclic alkylene group, for example a $C_3$ to $C_{15}$ cyclic alkylene group, and as another example a $C_3$ to $C_{10}$ cyclic alkylene group.

A repeat unit represented by Formula 2 may be obtained through polymerization of a dicarboxylic acid component including an aromatic dicarboxylic acid and a diol component including a $C_3$ to $C_{20}$ cyclic alkylene group.

The aromatic dicarboxylic acid component may be substantially the same as the dicarboxylic acid component used in Formula 1.

The diol component used as a reaction material to provide the repeat unit of Formula 2 includes a diol including a $C_3$ to $C_{20}$ cyclic alkylene group, and can improve miscibility between the components of the thermoplastic resin composition, thereby providing further improved properties to a molded article formed of the thermoplastic resin composition in terms of impact resistance, flowability, dimensional stability, external appearance, and the like.

Examples of the diol including a $C_3$ to $C_{20}$ cyclic alkylene group may include without limitation 1,4-cyclohexanediol, 1,4-cyclohexanedimethanol (CHDM), 1,4-cyclohexanediethanol, 1,4-cyclohexanedipropanol, 1,4-cyclohexanedibutanol, 1,4-cyclohexanolmethanol, 1,4-cyclohexanolethanol, 1,4-cyclohexanolpropanol, 1,4-cyclohexanolbutanol, 1,4-cyclohexanemethanolethanol, 1,4-cyclohexanemethanolpropanol, 1,4-cyclohexanemethanolbutanol, 1,4-cyclohexaneethanolpropanol, 1,4-cyclohexaneethanolbutanol, 1,4-cyclohexanepropanolbutanol, and the like, and mixtures thereof. The diol may be a diol having a 1,3 (meta) or 1,2 (ortho) arrangement instead of a 1,4 (para) arrangement.

In exemplary embodiments, the polyester resin may be prepared through polycondensation of the dicarboxylic acid component and the diol component including the diol including a $C_1$ to $C_{20}$ linear alkylene group or $C_3$ to $C_{20}$ branched alkylene group, and optionally, the diol including a $C_3$ to $C_{20}$ cyclic alkylene group. With these components, the thermoplastic resin composition can have the aforementioned effects.

The polyester resin may have an inherent viscosity of about 0.5 dl/g to about 1.0 dl/g, for example, about 0.6 dl/g to about 0.9 dl/g, for example, 0.6 dl/g, 0.7 dl/g, 0.8 dl/g, or 0.9 dl/g, as measured at 35° C. using an o-chlorophenol solution (concentration: 0.5 g/dl). Within this range of viscosity, the polyester resin can improve miscibility between the components of the thermoplastic resin composition and a molded article formed of the thermoplastic resin composition can exhibit good properties in terms of impact resistance, flowability, dimensional stability, external appearance, and the like.

The base resin can include the polyester resin in an amount of about 20 wt % to about 40 wt %, for example about 25 wt % to about 40 wt %, based on the total weight (100 wt %) of the base resin. In some embodiments, the base resin can include the polyester resin in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the polyester resin can be present in an amount of from about any of the foregoing amounts to about any other of the foregoing amounts.

Within this range, a molded article formed of the thermoplastic resin composition can have a good balance between thermal resistance and flowability.

In exemplary embodiments, the polycarbonate resin (A) and the polyester resin (B) may be present in a weight ratio of about 4:1 to about 2:1, for example, 60:40, 65:35, 75:25, or 80:20, in the base resin. Within this range, the thermoplastic resin composition can have improved miscibility between the components thereof and a molded article formed of the thermoplastic resin composition can exhibit good properties in terms of impact resistance, flowability, dimensional stability, external appearance, and the like.

Linear (Meth)Acrylic Resin

The linear (meth)acrylic resin can improve moldability and compatibility of the thermoplastic resin composition. For example, the linear (meth)acrylic resin can allow stable extrusion even with a high amount of the polyester resin in the thermoplastic resin composition, thereby improving moldability of the thermoplastic resin composition and compatibility of a molded article produced using the thermoplastic resin composition.

The linear (meth)acrylic resin may be a copolymer of at least two kinds (two or more different ones) of $C_1$ to $C_{20}$ alkyl (meth)acrylates. Examples of the alkyl (meth)acrylate may include without limitation methyl (meth)acrylate, ethyl (meth)acrylate, propyl (meth)acrylate, n-butyl (meth)acrylate, t-butyl (meth)acrylate, iso-butyl (meth)acrylate, pentyl (meth)acrylate, hexyl (meth)acrylate, heptyl (meth)acrylate, ethylhexyl (meth)acrylate, octyl (meth)acrylate, isooctyl (meth)acrylate, nonyl (meth)acrylate, decyl (meth)acrylate, lauryl (meth)acrylate, and the like, and mixtures thereof.

For example, the linear (meth)acrylic resin may be a copolymer of methyl methacrylate (MMA) and butyl acrylate (BA).

In exemplary embodiments, the copolymer of methyl methacrylate (MMA) and butyl acrylate (BA) may include methyl methacrylate (MMA) and butyl acrylate (BA) in a mole ratio of about 1:9 to about 9:1, for example about 2:8 to about 8:2, as another example about 3:7 to about 7:3, and as other examples, 3:7 to 7:3, 4:6 to 6:4, or 5:5. Within this range, a molded article formed of the thermoplastic resin composition can have improved compatibility.

The linear (meth)acrylic resin may be prepared by typical radical polymerization. For example, the linear (meth) acrylic resin may be prepared by mixing two or more $C_1$ to $C_{20}$ alkyl (meth)acrylates and a radical polymerization initiator. The radical polymerization initiator may include peroxide, persulfate, azo cyanide, and/or redox-based initiators, without being limited thereto.

The thermoplastic resin composition can include the linear (meth)acrylic resin in an amount of about 1 part by weight to about 3 parts by weight based on about 100 parts by weight of the base resin. In some embodiments, the thermoplastic resin composition can include the linear (meth)acrylic resin in an amount of about 1, 2, or 3 parts by weight. Further, according to some embodiments of the present invention, the linear (meth)acrylic resin can be present in an amount of from about any of the foregoing amounts to about any other of the foregoing amounts.

Within this range of the linear (meth)acrylic resin, the thermoplastic resin composition can have good properties in terms of flowability and rigidity.

Additive(s)

The thermoplastic resin composition according to the present invention may further include at least one or more additives, as needed. Examples of the additives can include without limitation antimicrobial agents, heat stabilizers, release agents, photostabilizers, dyes, inorganic additives, surfactants, coupling agents, plasticizers, admixtures, lubricants, antistatic agents, pigments, toners, flame retardants, colorants, UV absorbers, UV blocking agents, fillers, nucleating agents, adhesive aids, adhesives, and the like, and mixtures thereof.

The amount of the additive may be determined depending upon purposes of the thermoplastic resin composition so as not to deteriorate the properties thereof.

The thermoplastic resin composition according to the embodiments of the invention may be prepared by a typical method known in the art. For example, the thermoplastic resin composition may be prepared in pellet form by mixing the above components and optionally one or more additives using a Henschel mixer, a V blender, a tumbler blender, or a ribbon blender, followed by melt extrusion at about 150° C. to about 350° C. in a single-screw extruder or a twin-screw extruder. For example, the thermoplastic resin composition may be prepared in pellet form by extruding the mixture of the components and the additive at about 250° C. to about 310° C. using a twin screw extruder.

A molded article according to the present invention is produced from the thermoplastic resin composition. For example, the molded article may be produced from the thermoplastic resin composition by a method known in the art, for example, injection molding, blow molding, extrusion molding, casting molding, or the like.

The molded article may have a flexural modulus of 22,000 kgf/cm$^2$ or more, for example, about 22,000 kgf/cm$^2$ to about 40,000 kgf/cm$^2$, for example about 22,000 kgf/cm$^2$ to about 35,000 kgf/cm$^2$, for example about 22,000 kgf/cm$^2$ to about 30,000 kgf/cm$^2$, for example, 22,000 kgf/cm$^2$, 23,000 kgf/cm$^2$, 24,000 kgf/cm$^2$, 24,500 kgf/cm$^2$, 25,000 kgf/cm$^2$, 26,000 kgf/cm$^2$, 27,000 kgf/cm$^2$, 28,000 kgf/cm$^2$, 29,000 kgf/cm$^2$, or 30,000 kgf/cm$^2$, as measured on a 6.4 mm thick specimen in accordance with ASTM D790.

The molded article may have a spiral flow of about 36 cm or more, for example about 36 cm to about 50 cm, for example about 40 cm to about 50 cm, for example, 40 cm, 41 cm, 42 cm, 43 cm, 44 cm, 45 cm, 46 cm, 47 cm, 48 cm, 49 cm, or 50 cm, as measured under conditions of a mold temperature of 80° C. and an injection molding temperature of 270° C. in a mold having a 2 mm thick spiral cavity having a width of 5 mm.

The molded article may have a heat deflection temperature (HDT) of about 100° C. or more, for example about 100° C. to about 150° C., for example about 105° C. to about 120° C., for example, 105° C., 105.5° C., 105.8° C., 106° C., 106.1° C., 107° C., 108° C., 109° C., 110° C., 111° C., 112° C., 113° C., 114° C., or 115° C., as measured on a 6.4 mm thick specimen under a load of 18.56 kgf/cm$^2$ in accordance with ASTM D648.

Next, the present invention will be described in more detail with reference to the following examples. It should be understood that these examples are provided for illustration only and are not to be construed in any way as limiting the present invention.

Descriptions of details apparent to those skilled in the art will be omitted.

EXAMPLE

Details of components used in Examples and Comparative Examples are as follows.

(A) Polycarbonate (PC) Resin (a1) An Infino® series product (Samsung SDI Chemicals) having a weight average molecular weight of 24,000 is used.

(a2) An Infino® series product (Samsung SDI Chemicals) having a weight average molecular weight of 27,000 is used.

(B) Polyester Resin (b1) Skypet BB-8055 (SK Chemicals), which is a polyethylene terephthalate (PET) resin having an inherent viscosity of 0.8 dl/g, as measured at 35° C. using an o-chlorophenol solution (concentration: 0.5 g/dl), is used.

(b2) Skypet BL-8050 (SK Chemicals), which is a polyethylene terephthalate (PET) copolymer resin having an inherent viscosity of 0.8 dl/g, as measured at 35° C. using an o-chlorophenol solution (concentration: 0.5 g/dl), is used.

(C) Linear (Meth)Acrylic Resin

Plastistrength 552 (Arkema Co., Ltd.), which is a linear copolymer of methyl methacrylate (MMA) and butyl acrylate (BA), is used.

(C') Non-linear (meth)acrylic resin of core-shell structure: Kane Ace FM-40 (Kakeka Co., Ltd.), which is a core-shell copolymer having a core composed of butyl acrylate (BA) rubber and a shell composed of poly(methyl methacrylate) (PMMA), is used.

(D) Ethylene-methyl acrylate copolymer resin: Elvaloy AC1330 (DuPont) is used.

Example 1

100 parts by weight of a base resin comprising 75 wt % of (a1) the polycarbonate (PC) resin and 25 wt % of (b1) the polyester resin, and 2 parts by weight of the (C) linear (meth)acrylic resin are mixed in amounts as listed in Table 1, followed by extrusion at 260° C. using a twin-screw extruder (L/D=29, F=36 mm), thereby preparing a resin composition in pellet form using a pelletizer.

Examples 2 to 4 and Comparative Examples 1 to 8

Resin compositions are prepared in pellet form in the same manner as in Example 1 except for using the compositions as listed in Table 1.

TABLE 1

|  |  | Example | | | | Comparative Example | | | | | | | |
|---|---|---|---|---|---|---|---|---|---|---|---|---|---|
|  |  | 1 | 2 | 3 | 4 | 1 | 2 | 3 | 4 | 5 | 6 | 7 | 8 |
| (A) | (a1) | 75 | 75 | — | 30 | 75 | 75 | 61 | 40 | 75 | — | — | 65 |
|  | (a2) | — | — | 60 | 35 | — | — | — | — | — | 75 | 90 | — |
| (B) | (b1) | 25 | — | — | — | 25 | — | — | — | — | — | — | — |
|  | (b2) | — | 25 | 40 | 35 | — | 25 | 39 | 60 | 25 | 25 | 10 | 35 |
| Total (wt %) | | 100 | 100 | 100 | 100 | 100 | 100 | 100 | 100 | 100 | 100 | 100 | 100 |
| (C) (parts by weight) | | 2 | 1 | 3 | 3 | — | — | — | 2 | — | 5 | 2 | — |
| (C') (parts by weight) | | — | — | — | — | — | — | — | — | 1 | — | — | — |
| (D) (parts by weight) | | — | — | — | — | — | — | — | — | — | — | — | 8 |

Specimens are produced using the resin composition of the Examples and Comparative Examples and evaluated as to the following properties. Evaluation results are shown in Table 2.

Evaluation of Properties

Preparation of specimen: The resin compositions prepared in pellet form are dried in an oven at 100° C. for 3 hours or more and are injection-molded using a 10 oz. injection molding machine at a molding temperature of 250° C. to 270° C. and a mold temperature of 60° C. to 80° C., thereby producing specimens for property evaluation in accordance with the corresponding standards for property evaluation.

(1) Flowability (spiral flow, cm): Spiral flow (unit: cm) is measured under conditions of a mold temperature of 80° C. and an injection molding temperature of 270° C. in a mold having a 2 mm thick spiral cavity having a width of 5 mm. A higher spiral flow indicates better flowability.

(2) Rigidity (flexural modulus, $kgf/cm^2$): A specimen having a size of 6.4 mm×12.7 mm×125 mm is prepared by the above method and measured as to flexural modulus in accordance with ASTM D790.

(3) Thermal resistance (heat deflection temperature, unit: ° C.): A specimen having a size of 6.4 mm×12.7 mm×125 mm is prepared by the above method and measured as to heat deflection temperature (HDT) under a load of 18.56 $kgf/cm^2$ in accordance with ASTM D648.

(4) Compatibility (peeling evaluation): A specimen having a size of 3.2 mm×10 mm×10 mm is prepared by the above method, and a portion around an injection molded article gate is observed with the naked eye. Occurrence of peeling is represented by ○ and no occurrence of peeling is represented by x. Peeling of the molded article means poor compatibility.

TABLE 2

|  | Example | | | | Comparative Example | | | | | | | |
|---|---|---|---|---|---|---|---|---|---|---|---|---|
|  | 1 | 2 | 3 | 4 | 1 | 2 | 3 | 4 | 5 | 6 | 7 | 8 |
| Spiral flow (270° C., cm) | 43 | 45 | 43 | 43 | Extrusion impossible | Extrusion impossible | Extrusion impossible | 51 | Extrusion impossible | 32 | 30 | 52 |
| Flexural modulus (1000 $kgf/cm^2$) | 24 | 24 | 25 | 24.5 |  |  |  | 24 |  | 21 | 23 | 17 |
| Thermal resistance (HDT, ° C.) | 112 | 109 | 106 | 107 |  |  |  | 90 |  | 110 | 112 | 106 |
| Peeling | x | x | x | x |  |  |  | x |  | x | x | ○ |

As shown in Table 2, it can be seen that the thermoplastic compositions of the Examples exhibit good flowability without deterioration in thermal resistance and have good properties in terms of extrusion stability, rigidity and compatibility. Conversely, the thermoplastic compositions of the Comparative Examples fail to have such advantageous effects of the present invention.

Although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. Therefore, the scope of the present invention should be defined by the appended claims and equivalents thereof.

What is claimed is:

1. A thermoplastic resin composition consisting essentially of:
   100 parts by weight of a base resin comprising 60 wt % to 75 wt % of a polycarbonate (PC) resin and 25 wt % to 40 wt % of a polyester resin comprising a repeat unit represented by the following Formula 1:

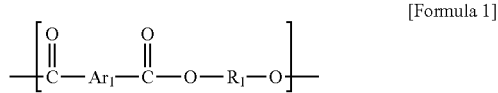
   [Formula 1]

wherein $Ar_1$ is a substituted or unsubstituted $C_6$ to $C_{18}$ arylene group and $R_1$ is a $C_1$ to $C_{20}$ linear alkylene group or a $C_3$ to $C_{20}$ branched alkylene group; and
   1 part by weight to 3 parts by weight of a linear (meth)acrylic resin, wherein the linear (meth)acrylic resin is a copolymer of methyl methacrylate (MMA) and butyl acrylate (BA); and
   optionally an additive selected from the group consisting of antimicrobial agents, heat stabilizers, release agents, photostabilizers, dyes, inorganic additives, surfactants, coupling agents, plasticizers, admixtures, lubricants, antistatic agents, pigments, toners, flame retardants, colorants, UV absorbers, UV blocking agents, fillers, nucleating agents, adhesive aids, adhesives, and mixtures thereof,
   wherein a molded article comprising the thermoplastic resin composition has a spiral flow of 40 cm to 50 cm, as measured under conditions of a mold temperature of 80° C. and an injection molding temperature of 270° C. in a mold having a 2 mm thick spiral cavity having a width of 5 mm; a flexural modulus of 24,000 kgf/cm² to 40,000 kgf/cm², as measured on a 6.4 mm thick specimen in accordance with ASTM D790; and a heat deflection temperature (HDT) of 100° C. to 150° C., as measured under a load of 18.56 kgf/cm² in accordance with ASTM D648.

2. The thermoplastic resin composition according to claim 1, wherein the polyester resin further comprises more than 0 mol % to about 40 mol % of a repeat unit represented by the following Formula 2:

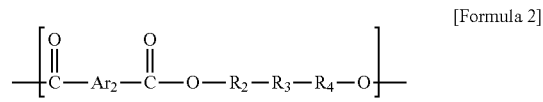
   [Formula 2]

wherein $Ar_2$ is a substituted or unsubstituted $C_6$ to $C_{18}$ arylene group; $R_2$ and $R_4$ are the same or different and are each independently a single bond, a $C_1$ to $C_{20}$ linear alkylene group, or a $C_3$ to $C_{20}$ branched alkylene group; and $R_3$ is a $C_3$ to $C_{20}$ cyclic alkylene group.

3. The thermoplastic resin composition according to claim 1, wherein the polycarbonate (PC) resin has a weight average molecular weight (Mw) of about 20,000 g/mol to about 100,000 g/mol.

4. The thermoplastic resin composition according to claim 1, wherein the polyester resin has an inherent viscosity of about 0.5 dl/g to about 1 dl/g, as measured at 35° C. using an o-chlorophenol solution with a concentration of 0.5 g/dl.

5. The thermoplastic resin composition according to claim 1, wherein the copolymer of methyl methacrylate (MMA) and butyl acrylate (BA) comprises methyl methacrylate (MMA) and butyl acrylate (BA) in a mole ratio of about 1:9 to about 9:1.

6. A molded article comprising the thermoplastic resin composition according to claim 1.

7. A thermoplastic resin composition consisting essentially of:
   100 parts by weight of a base resin of 60 wt % to 75 wt % of a polycarbonate resin and 25 wt % to 40 wt % of polyethylene terephthalate and/or polyethylene terephthalate copolymer; and
   1 part by weight to 3 parts by weight of a linear copolymer of methyl methacrylate and butyl acrylate,
   wherein a molded article comprising the thermoplastic resin composition has a spiral flow of 40 cm to 50 cm, as measured under conditions of a mold temperature of 80° C. and an injection molding temperature of 270° C. in a mold having a 2 mm thick spiral cavity having a width of 5 mm; a flexural modulus of 24,000 kgf/cm² to 40,000 kgf/cm², as measured on a 6.4 mm thick specimen in accordance with ASTM D790; and a heat deflection temperature (HDT) of 100° C. to 150° C., as measured under a load of 18.56 kgf/cm² in accordance with ASTM D648.

\* \* \* \* \*